United States Patent
Ocana Amezcua et al.

(10) Patent No.: US 11,298,983 B2
(45) Date of Patent: Apr. 12, 2022

(54) PNEUMATIC VEHICLE TIRES

(71) Applicant: Continental Reifen Deutschland GmbH, Hannover (DE)

(72) Inventors: Jesus Ocana Amezcua, Hannover (DE); Andre Lutz, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 16/610,177

(22) PCT Filed: Feb. 27, 2018

(86) PCT No.: PCT/EP2018/054721
§ 371 (c)(1),
(2) Date: Nov. 1, 2019

(87) PCT Pub. No.: WO2018/206175
PCT Pub. Date: Nov. 15, 2018

(65) Prior Publication Data
US 2020/0070586 A1 Mar. 5, 2020

(30) Foreign Application Priority Data

May 11, 2017 (DE) ...................... 10 2017 208 010.8

(51) Int. Cl.
*B60C 11/04* (2006.01)
*B60C 11/03* (2006.01)

(52) U.S. Cl.
CPC ..... *B60C 11/042* (2013.01); *B60C 2011/0353* (2013.01); *B60C 2011/0355* (2013.01); *B60C 2200/06* (2013.01)

(58) Field of Classification Search
CPC ....... B60C 11/03; B60C 11/04; B60C 11/042; B60C 11/13; B60C 2011/133; B60C 11/0323; B60C 11/1281; B60C 11/1272
(Continued)

(56) References Cited

U.S. PATENT DOCUMENTS 2,781,815 A 2/1957 Vance
2,843,172 A 7/1958 Verne et al.
(Continued)

FOREIGN PATENT DOCUMENTS

CN 101311008 A 11/2008
DE 102013107343 A1 1/2015
(Continued)

OTHER PUBLICATIONS

International Search Report dated May 24, 2019 of international application PCT/EP2018/054721 on which this application is based.

*Primary Examiner* — Cedrick S Williams
(74) *Attorney, Agent, or Firm* — David L. Cate; Gregory Adams

(57) ABSTRACT

A pneumatic vehicle tire, in particular a commercial vehicle tire, includes a tread which has a profile and has at least one circumferential groove (1) which is encircling in the circumferential direction, is embodied to a profile depth ($P_T$) and in the cross section, starting at the tread external face, is composed of three adjoining groove portions, one outer groove portion (2) that expands in a funnel-shaped manner toward the outside, one 1 mm to 3 mm wide contracted groove portion, and one inner groove portion (4) which lies radially inward, is expanded in relation to the contracted groove portion (3) and has the largest cross-sectional face of all portions, and which is delimited by two cover flanks (4a), lateral groove flanks (4'b, 4"b) that adjoin said cover flanks (4a), and a groove base (4c).

12 Claims, 4 Drawing Sheets

Figure 4A:
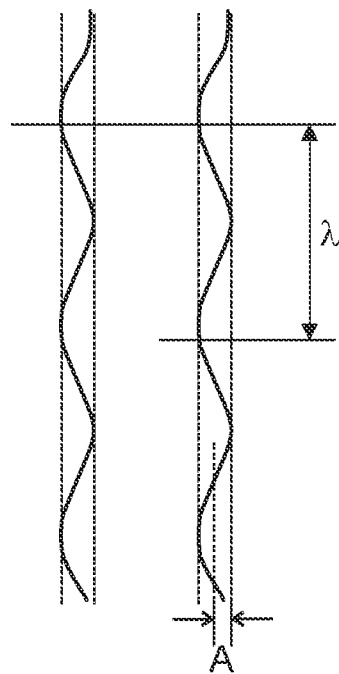

(58) Field of Classification Search
USPC .................................................. 152/209.17
See application file for complete search history.

(56) References Cited

U.S. PATENT DOCUMENTS

| | | | |
|---|---|---|---|
| 3,094,157 A | 6/1963 | Klohn | |
| 4,481,992 A | 11/1984 | Hiroyoshi et al. | |
| 5,830,294 A | 11/1998 | Shibata et al. | |
| 2008/0000564 A1* | 1/2008 | Mukai | B60C 11/1384 |
| | | | 152/209.8 |
| 2013/0037191 A1* | 2/2013 | Suzuki | B60C 11/04 |
| | | | 152/209.9 |
| 2013/0098520 A1 | 4/2013 | Kato | |
| 2015/0290980 A1* | 10/2015 | Qu | B60C 11/1307 |
| | | | 152/209.18 |
| 2016/0318347 A1 | 11/2016 | Damien et al. | |
| 2016/0318348 A1 | 11/2016 | Cambon et al. | |
| 2019/0275842 A1* | 9/2019 | Mita | B60C 11/0304 |

FOREIGN PATENT DOCUMENTS

| | | | | |
|---|---|---|---|---|
| EP | 0213452 A2 * | 3/1987 | | B60C 11/12 |
| EP | 1995081 A1 | 11/2008 | | |
| EP | 2000329 A1 * | 12/2008 | | B60C 11/1392 |
| EP | 2191984 A2 * | 6/2010 | | B60C 11/0323 |
| EP | 2567832 A1 | 3/2013 | | |
| JP | S62286803 A | 12/1987 | | |
| JP | H09164814 A | 6/1997 | | |
| JP | H1024705 A | 1/1998 | | |
| JP | 2007001434 A | 1/2007 | | |
| JP | 2007314029 A * | 12/2007 | | B60C 11/042 |
| JP | 2014076764 A | 5/2014 | | |
| WO | 2015003837 A1 | 1/2015 | | |
| WO | 2017025212 A1 | 2/2017 | | |

* cited by examiner

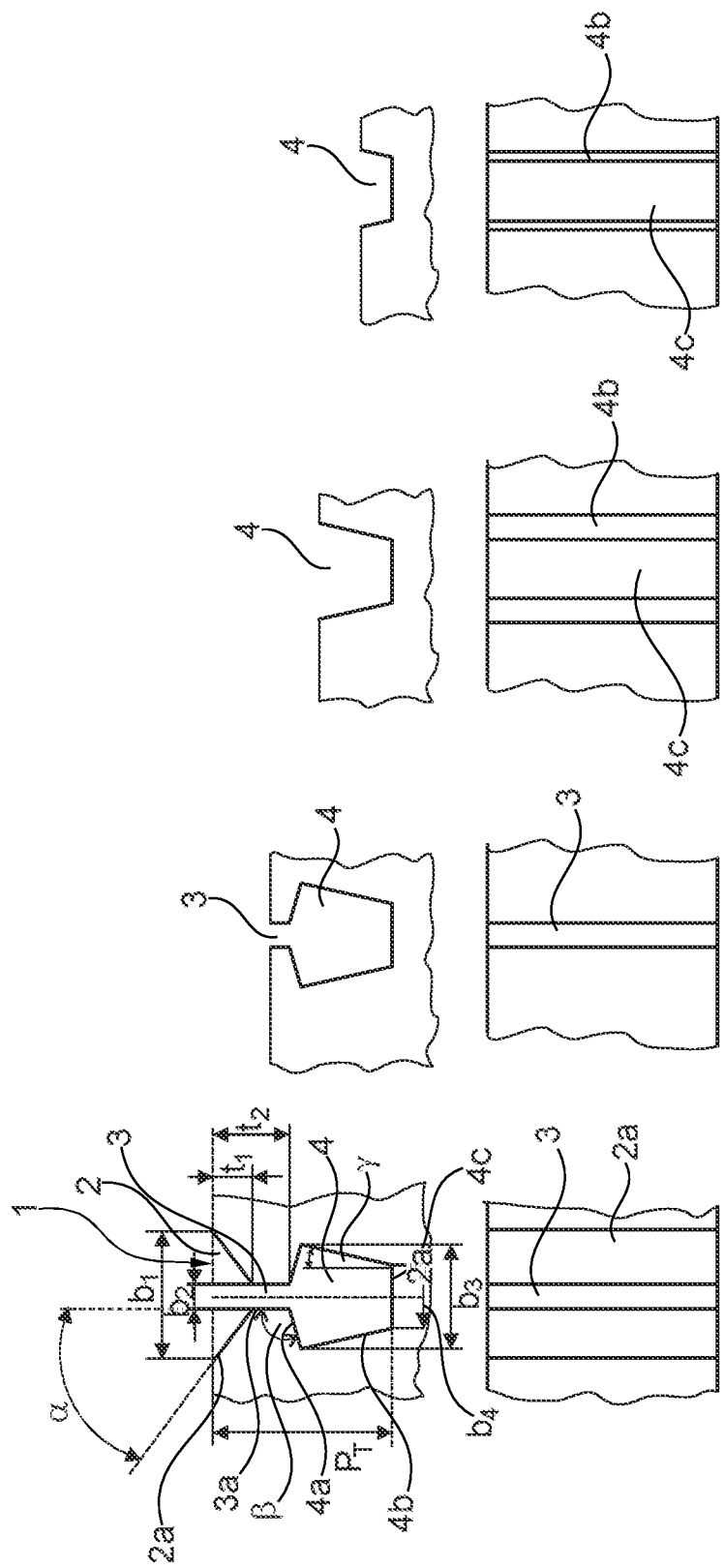

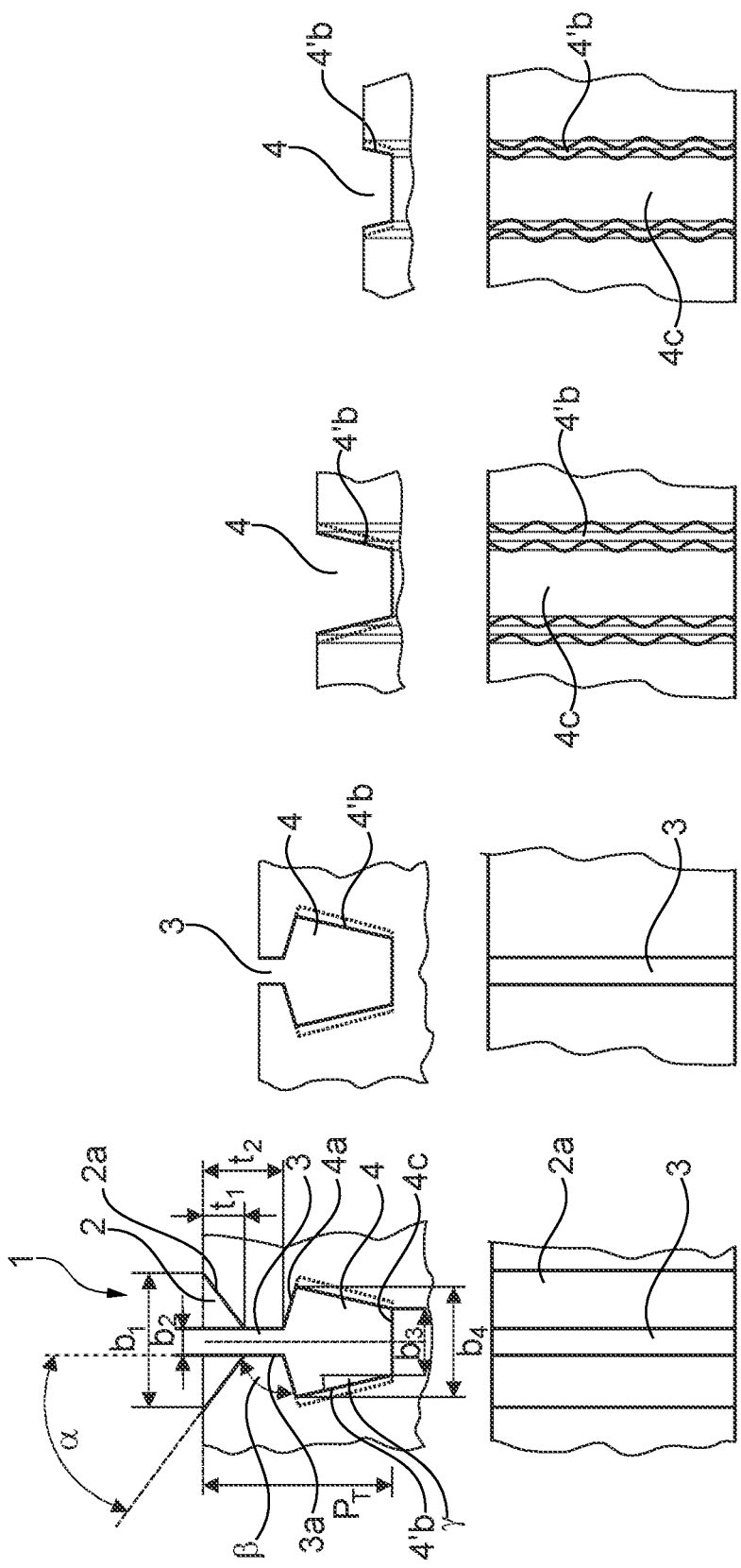

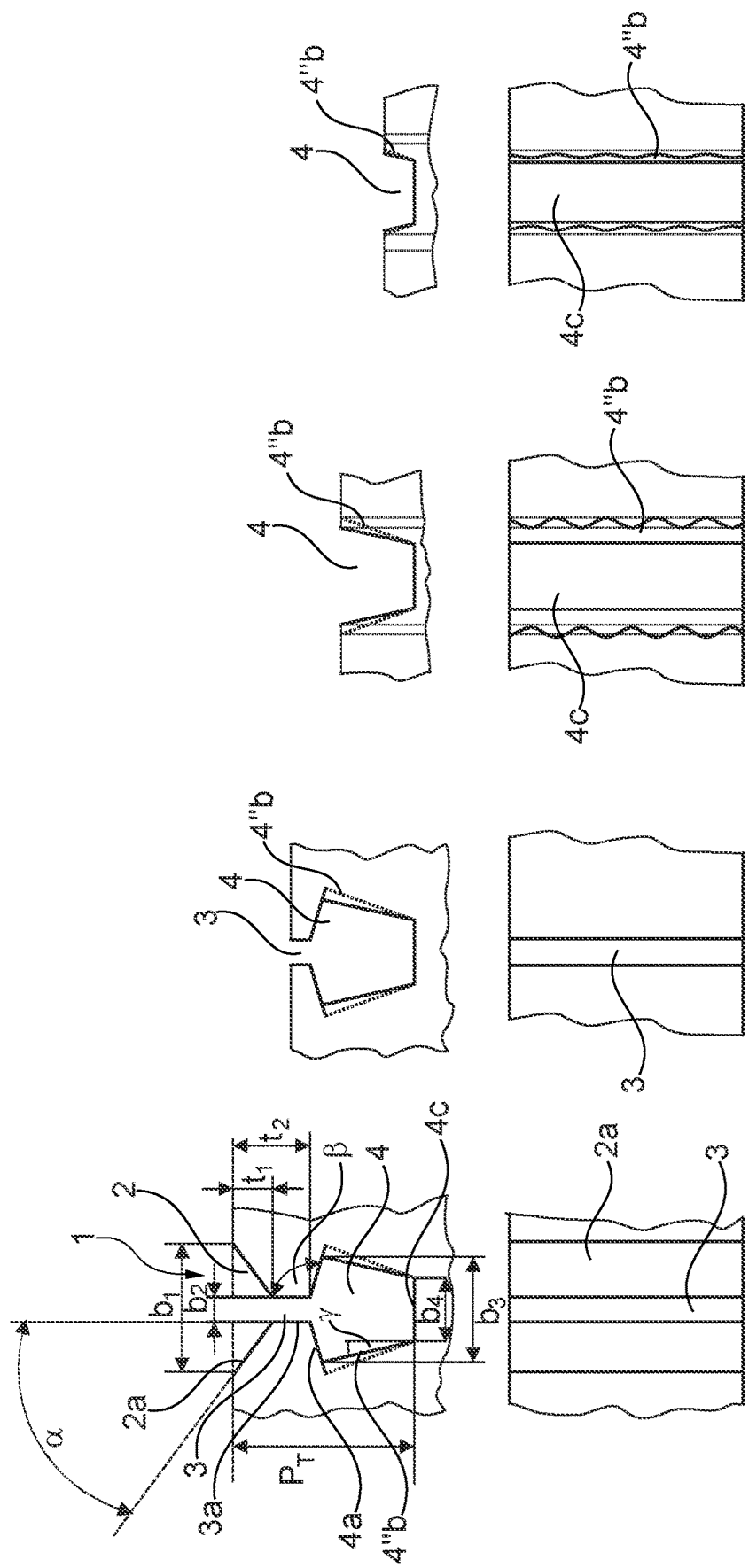

PNEUMATIC VEHICLE TIRES

The invention relates to a pneumatic vehicle tire, in particular a commercial vehicle tire, having a tread which has a profile and has at least one circumferential groove which is encircling in the circumferential direction, is embodied to a profile depth and in the cross section, starting at the tread external face, is composed of three adjoining groove portions, one outer groove portion that expands in a funnel-shaped manner toward the outside, one 1 mm to 3 mm wide contracted groove portion, and one inner groove portion, which lies radially inward, is expanded in relation to the contracted groove portion and has the largest cross-sectional face of all portions, and which is delimited by two cover flanks, lateral groove flanks that adjoin said cover flanks, and a groove base.

It is known and commonplace for at least two circumferential grooves that are encircling in the circumferential direction to be provided in tread of commercial vehicle tires. Such circumferential grooves mutually separate circumferential ribs which can be provided with further grooves, for example transverse grooves, which impart to the circumferential grooves a block-type structure. Circumferential grooves which are delimited by groove flanks that run at a minor angle in relation to the radial direction are widely used in tread of commercial vehicle tires. However, significantly more complex design embodiments of the cross sections of circumferential grooves are also known, for example having groove flanks having protrusions designed in a multiplicity of ways in order to prevent rocks from lodging in the circumferential grooves and to facilitate the ejection of the rocks. For example, the tread known from U.S. Pat. No. 2,843,172 A has circumferential grooves of this type.

Commercial vehicle tires having treads of the type mentioned at the outset are also known, for example the commercial vehicle tire marketed under the name X Line Energy D2 by Michelin. Pneumatic vehicle tires having circumferential grooves of this type in the tread have the advantage of positive de-watering of the tread in the case of a new tire, and as a result of the contracted second groove portions prevent rocks from lodging. The third, expanded, groove portion finally ensures largely uniform abrasion in the case of increasing abrasion of the tread. The wet grip characteristics and the braking performance on wet ground are unsatisfactory in the case of further progressive abrasion of the tread.

The invention is thus based on the object of by way of a simple measure significantly improving the wet grip characteristics and the braking characteristics in the wet in the case of a commercial vehicle tire of the type mentioned at the outset in each stage of wear in which the radially inner, expanded groove portion is already present on the tread external face.

The object set is achieved according to the invention in that the lateral groove flanks in the expanded groove portion, while reducing the mutual spacing thereof from the groove base, run at an angle of 5° to 25° in relation to the radial direction and in the direction of the circumferential extent of said lateral groove flanks run in a wave form.

On account of the design embodiment according to the invention of the groove flanks in the radially inner expanded groove portion in a wave form, the groove edges on the tread external face, when reaching the respective abraded state, on account of the wave form thereof have a significantly larger edge length than groove edges that run in a straight manner. A noticeable improvement of wet grip and an improvement of the braking characteristics on wet road surfaces is achieved on account thereof.

In the case of one preferred embodiment, the groove flanks have a wave form having a preferably constant wave length which corresponds to at least ⅛ of the pitch length, or ⅛ of the mean pitch length of the profile of the tread, respectively, and at most the pitch length, or the mean pitch length of the profile of the tread, respectively. A particularly significant improvement of wet grip and of the braking characteristics on wet road surfaces can be achieved by way of an embodiment of this type in the case of further progressive abrasion.

In the case of one further preferred embodiment, the groove flanks have a wave form having a constant amplitude. In the case of one alternative embodiment, the groove flanks have a wave form having an amplitude which continuously decreases from the radially outer end of the groove flanks to the groove base, in particular decreases to the value of zero toward the groove base. The constant, or the greatest, respectively, amplitude of the wave form of the groove flanks herein is preferably 0.5 mm to 2.0 mm. Depending on the type of tire and also on the depth of the circumferential grooves, it is advantageous in particular with a view to uniform abrasion to provide either a wave form having a constant amplitude or a wave form having a decreasing amplitude.

Treads in which the individual groove portions of the circumferential grooves have dimensions that are mutually adapted in a specific way are particularly balanced in terms of wet grip, braking characteristics on wet ground and uniform abrasion. In this context, a design embodiment in which the expanded groove portion has the largest cross-sectional width thereof at the radially outer end of the groove flanks thereof is preferable, wherein the largest cross-sectional width is determined according to the correlation $b_3 = b_1 \times (a_2 + a_1)$, where $b_1$ is the cross-sectional width of the radially outer groove portion on the tread external face, and where $a_1$ and $a_2$ are parameters to which $0 \leq a_1 \leq 0.1\ b_1$ and $0.4 \leq a_2 \leq 1$ applies. In the case of a design embodiment that is likewise advantageous in this context, the groove base in the expanded groove portion has a cross-sectional width $b_4$ which is determined according to the correlation $b_4 = b_1 \times (a_3 + a_1)$, where $b_1$ is the cross-sectional width of the radially outer groove portion on the tread external face, and where $a_1$ and $a_3$ are parameters to which $0 \leq a_1 \leq 0.1\ b_1$ and $0.2 \leq a_3 \leq 0.6$ applies.

A further measure which is advantageous in particular for uniform abrasion lies in that the cover flanks that participate in delimiting the expanded groove portion mutually run in the manner of a pointed roof and at an obtuse external angle of 95° to 135° in relation to the radial direction.

In order to ensure a particular positive wet grip and particular positive braking characteristics on wet ground even in the new state of the tire, it is advantageous for the radially outer funnel-shaped groove portion to be formed by two groove flanks which in relation to the radial direction run at an angle of 25° to 70°, and for the width of the radially outer groove portion that is funnel-shaped in the cross section to be 3.0 mm to 22.0 mm on the tread external face. The radially outer groove portion that is funnel-shaped in the cross section herein reaches down to a depth of 15% to 30% of the profile depth.

The wet grip and the braking characteristics on wet ground can be improved by way of embodiments in which the mutually opposite groove flanks in the radially inner groove portion have wave forms that run in a mutually parallel manner, as well as by way of embodiments in which the mutually opposite groove flanks in the radially inner groove portion have wave forms that run in a mutually symmetrical manner in relation to a central plane of the circumferential groove that runs in the radial direction.

In principle, embodiments in which the circumferential grooves overall are embodied so as to be symmetrical in relation to the central planes thereof that run in the radial direction are preferred.

Further features, advantages and details of the invention will now be explained in more detail on the basis of the drawing which illustrates a plurality of exemplary embodiments.

Figure 4B:
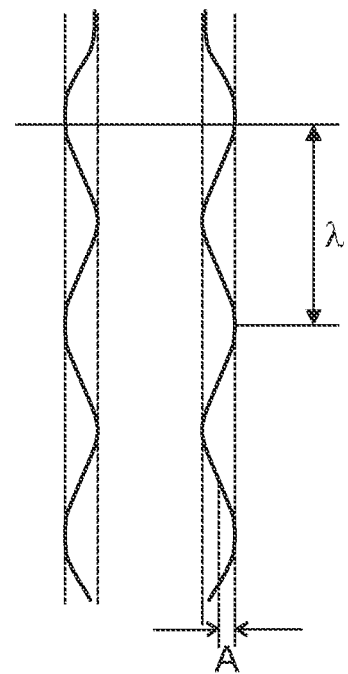
Figure 5A:
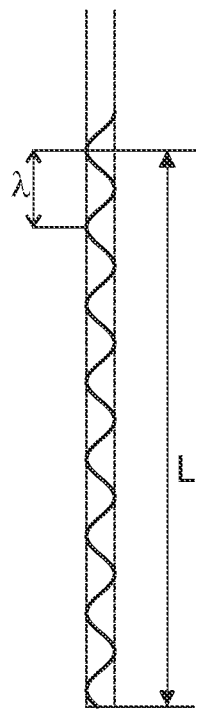
Figure 5B:
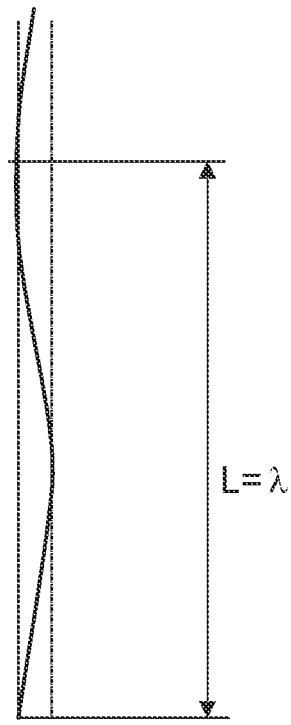

In the drawing:

FIG. 1a to FIG. 1d show cross sections of a circumferential groove of a tread of a pneumatic vehicle tire in the case of increasing abrasion of the tread, wherein each cross section is assigned an associated plan view of a short circumferential portion of the circumferential groove;

FIGS. 2a to 2d, and FIG. 3a to FIG. 3d show further variants of embodiment of a circumferential groove in illustrations that are analogous to those of FIGS. 1a to 1d;

FIGS. 4a and 4b show schematic views (plan views) of embodiments of wave forms of groove flanks; and FIG. 5a and FIG. 5b show schematic views (plan views) of wave forms of groove flanks in order to explain wave length ranges.

FIGS. 1a to 1d, 2a to 2d, and 3a to 3d show in each case cross sections through a circumferential groove in a tread of a pneumatic vehicle tire as well as the associated plan views of circumferential portions of the circumferential groove. Circumferential grooves designed according to the invention are provided in numbers of in particular two to five, and preferably in treads of commercial vehicle tires. The circumferential grooves in the circumferential direction subdivide the tread into profile ribs, optionally conjointly with circumferential grooves of another design. The profile ribs can be structured in a block-type manner known per se. The circumferential grooves 1 are part of main grooves or are main grooves in the tread and are therefore embodied to the provided profile depth $P_T$, the latter usually being between 12 mm and 25 mm, depending on the type of tire.

FIGS. 1a, 2a, and 3a show in each case a circumferential groove 1 in the state thereof in the case of a new tire. The circumferential groove 1 is embodied so as to be symmetrical in relation to a centric plane which runs in the radial direction and in FIGS. 1a, 2a, and 3a is indicated by a dashed line, and in the radial direction has three portions, a radially outer groove portion 2, a contracted groove portion 3, and an expanded inner groove portion 4.

The radially outer groove portion 2 is designed so as to be funnel-shaped in the cross section, widens toward the tread external face, and is delimited by two groove flanks 2a which run at an angle $\alpha$ of 25° to 70°, in particular 45° to 70°, in relation to the radial direction. The width $b_1$ of the groove portion 2 on the tread external face is 3 mm to 22 mm, in particular 8 mm to 22 mm, depending on the type of tire. The groove portion 2 in the radial direction extends down to a depth $t_1$ which is 15% to 30% of the profile depth $P_T$. The contracted groove portion 3 which is delimited by two groove flanks 3a that run in the radial direction and adjoin the groove flanks 2a directly adjoins the groove portion 2. The width $b_2$ of the groove portion 3 is 1 mm to 3 mm. The groove portion 3 reaches down to a depth $t_2$ which is 30% to 60%, in particular up to 45%, of the profile depth $P_T$. The expanded inner groove portion 4 which is delimited by two cover flanks 4a, a groove base 4c, in the case of the embodiment according to FIGS. 1a to 1d by two lateral groove flanks 4b, in the case of the embodiment according to FIGS. 2a to 2d by two lateral groove flanks 4'b, and in the case of the embodiment according to FIGS. 3a to 3d by two lateral groove flanks 4"b, directly adjoins the groove portion 3.

Proceeding from the groove flanks 3a, the two cover flanks 4a in relation to the former run in each case at an obtuse external angle $\beta$ which is 95° to 135°, in particular up to 105°. The groove portion 4 has the largest width $b_3$ thereof at the outer ends of the two cover flanks 4a. The two lateral groove flanks 4b, 4'b, and 4"b adjoin in each case directly to the cover flanks 4a and, while decreasing the mutual spacing of said lateral groove flanks 4b, 4'b, 4"b, run in the direction of the groove base 4c at an angle $\gamma$ of 5° bis 25°, preferably of 10° to 20° in relation to the radial direction. The groove base 4c which is situated in the profile depth $P_T$ connects the radially inner ends of the lateral groove flanks 4b and has a width $b_4$.

Ranges for the size of the widths $b_3$ and $b_4$ are determined by means of parameters $a_1$, $a_2$, and $a_3$ which are defined as follows:

$a_1$: $0 \leq a_1 \leq 0.1\ b_1$
$a_2$: $0.4 \leq a_2 \leq 1$
$a_3$: $0.2 \leq a_3 \leq 0.6$.

From these parameters result
the width $b_3$ according to: $b_3 = b_1 \times (a_2 + a_1)$,
the width $b_4$ according to: $b_4 = b_1 \times (a_3 + a_1)$.

In the case of the embodiment shown in FIGS. 1a to 1d, the groove flanks 4b are planar faces. FIG. 1b shows a worn state of the tread in which the tread has been abraded to approximately the center of the groove portion 3; FIGS. 1c and 1d show abraded states in which the abrasion of the tread has already progressed such that only the expanded groove portion 4 is still present on the tread surface.

The embodiments of the circumferential groove 1 shown in FIGS. 2a to 2d and 3a to 3d differ from those according to FIGS. 1a to 1d in terms of the design embodiment of the lateral groove flanks 4'b and 4"b which are not planar faces but are in each case embodied in the manner of a wave form and have wave form that runs in the direction of the circumferential extent of said lateral groove flanks 4'b and 4"b. In the case of the embodiment according to FIGS. 2a to 2d the wave form has a constant wave length $\lambda$ and a constant amplitude A which is 0.5 mm to 2 mm, in particular up to 1 mm. The faces that on the internal side of the groove portion 4 encase the waves of the lateral groove flanks 4'b determine the widths $b_3$ and $b_4$ as well as the angle $\gamma$. FIG. 2b shows the circumferential groove 1 in the case of a new tire; FIGS. 2c and 2d show an abraded state in which the tread has already been abraded into the groove portion 4 such that the wave form of the radially outer edges of the lateral groove flanks 4'b and the wave form of the lateral delimitation edges of the groove base 4c can be seen in the plan view.

In the case of the embodiment shown in FIGS. 3a to 3d, the lateral groove flanks 4"b in the groove portion 4 likewise have a wave form which runs in the circumferential direction of the groove flanks 4"b. However, the amplitude A of the wave form varies in the case of this embodiment, said amplitude A continuously decreases from the radially outer end of the lateral groove flanks 4"b to the radially inner end of the groove flanks 4"b on the groove base 4c, in particular decreases to the value of zero. The wave length $\lambda$ remains in particular constant. The casing faces on the internal side of the lateral groove flanks 4"b in the case of this embodiment are also those faces which define the widths $b_3$ and $b_4$ as well as the angle γ, as has been explained and described above. The wave form of the lateral groove flanks 4"b at the radially outer ends thereof has the greatest amplitude A of said wave form, which is 0.5 mm to 2 mm, in particular up to 1 mm. FIG. 3c shows an abraded state of the tread in which the tread has been abraded into the groove portion 4; the wave form of the groove edges of the lateral groove flanks 4"b on the tread external face and the lateral peripheries of the groove base 4c that run in the circumferential direction and in a straight manner can be seen in the plan view. FIG. 3d shows an even more progressed abraded state; the wave form of the groove edges of the lateral groove flanks 4"b on the tread external face now have only a weak wave form having a smaller amplitude A than in FIG. 3c.

FIGS. 4a and 4b show potential design embodiments of the wave forms of the two mutually opposite lateral groove flanks 4'b, 4"b in the groove portion 4 in a plan view. According to FIG. 4a, the two mutually opposite lateral groove flanks 4'b, 4"b, have wave forms that run in a mutually parallel manner. In the case of the embodiment shown in FIG. 4b the wave forms of the two lateral groove flanks 4'b, 4"b are embodied so as to be symmetrical in relation to the centric symmetry plane.

FIGS. 5a and 5b highlight the preferred smallest and the preferred largest wave length λ of the wave form of the lateral groove flanks 4'b, 4"b. The minimum wave length c is shown in FIG. 5a and is ⅛ of the pitch length L of the profile of the tread, wherein the pitch length L is of identical size for all pitches that are provided across the circumference of the tread in the case of commercial vehicle tires. FIG. 5b shows the maximum wave length λ which corresponds to the pitch length L. A pitch length L in a tread profile of a commercial vehicle tire corresponds to the circumferential length of a profile block, for example, or of a profile positive that is structured in a block-type manner, including a transverse groove. In tread profiles having dissimilar pitch lengths, the pitch length L is the arithmetic mean value of the provided pitch lengths of dissimilar lengths.

Since circumferential grooves in the tread are usually interrupted by transverse grooves or the like that branch out from said circumferential grooves, the design embodiment according to the invention of the circumferential grooves is present in the corresponding circumferential portions of the circumferential grooves.

LIST OF REFERENCE SIGNS

1 . . . Circumferential groove
2 . . . Groove portion
2a . . . Groove flanks
3 . . . Groove portion
3a . . . Groove flanks
4 . . . Groove portion
4a . . . Cover flanks
4b, 4'b, 4"b . . . Groove flanks
4c . . . Groove base
$P_T$ . . . Profile depth
$b_1, b_2, b_3, b_4$ . . . Width
A . . . Amplitude
α, β, γ . . . Angles
$t_1, t_2$ . . . Depth
$a_1, a_2, a_3$ . . . Parameter
L . . . Pitch length
$P_T$ . . . Profile depth

The invention claimed is:

1. A pneumatic vehicle tire comprising a tread which has a profile and has at least one circumferential groove encircling in a circumferential direction and having a profile depth ($P_T$), wherein in a cross section and starting at an external face of the tread, the at least one circumferential groove is composed of three adjoining groove portions including:
one outer groove portion that expands in a funnel-shaped manner toward outsides of the pneumatic vehicle tire;
one 1 mm to 3 mm wide contracted groove portion; and,
one inner groove portion which lies radially inward, and is expanded in relation to the contracted groove portion and has the largest cross-sectional face of all portions, and which is delimited by two cover flanks, lateral groove flanks that adjoin the cover flanks, and a groove base;
wherein the lateral groove flanks in an expanded groove portion, while reducing the mutual spacing thereof from the groove base, run at an angle (γ) of 5° to 25° in relation to a radial direction and in a direction of the circumferential extent of the lateral groove flanks run in a wave form;
wherein the lateral groove flanks comprise the wave form having an amplitude (A) which continuously decreases from a radially outer end of the lateral groove flanks to the groove base, and decreases to a value of zero toward the groove base and wherein the wave form is sinusoidal;
wherein the lateral groove flanks are two mutually opposite lateral groove flanks in the at least one circumferential groove;
wherein the wave forms of the two mutually opposite lateral groove flanks are symmetrical in relation to a centric symmetry plane, and provided the wave forms of the two mutually opposite lateral groove flanks do not run in a mutually parallel manner;
wherein the lateral groove flanks comprise the wave form having a constant amplitude (A) and having a constant wave length (λ); and,
wherein the constant amplitude (A) of the wave form of the lateral groove flanks is from 0.5 mm to 2.0 mm.

2. The pneumatic vehicle tire as claimed in claim 1, wherein the lateral groove flanks comprise the wave form having the constant wave length (λ) which corresponds to at least ⅛ of a pitch length (L), and at most the pitch length (L).

3. The pneumatic vehicle tire as claimed in claim 1, wherein the expanded groove portion has a largest cross-sectional width ($b_3$) thereof at the radially outer end of the groove flanks, and wherein the largest cross-sectional width ($b_3$) is determined according to the correlation:

$$b_3 = b_1 \times (a_2 + a_1),$$

where $b_1$ is a cross-sectional width of the radially outer groove portion on the tread external face, and where $a_1$ and $a_2$ are parameters to which $0 \le a_1 \le 0.1 \ b_1$ and $0.4 \le a_2 \le 1$ applies.

4. The pneumatic vehicle tire as claimed in claim 1, wherein the groove base has a cross-sectional width $b_4$ which is determined according to the correlation:

$$b_4 = b_1 \times (a_3 + a_1),$$

where $b_1$ is a cross-sectional width of the radially outer groove portion on the tread external face, and where $a_1$ and $a_3$ are parameters to which $0 \le a_1 \le 0.1 \ b_1$ and $0.2 \le a_3 \le 0.6$ applies.

5. The pneumatic vehicle tire as claimed in claim 1, wherein the two cover flanks that participate in delimiting the expanded groove portion mutually run in the manner of a pointed roof and at an obtuse external angle (β) of from 95° to 135° in relation to the radial direction.

6. The pneumatic vehicle tire as claimed in claim 1, wherein the radially outer funnel-shaped groove portion is formed by two groove flanks which in relation to the radial direction run at an angle (α) of from 25° to 70°.

7. The pneumatic vehicle tire as claimed in claim 1, wherein a width ($b_1$) of the radially outer groove portion that is funnel-shaped in the cross section is from 3.0 mm to 22.0 mm on the tread external face.

8. The pneumatic vehicle tire as claimed in claim 1, wherein the contracted groove portion has groove flanks that run in the radial direction and reach down to a depth ($t_2$) of from 30% to 60% of the profile depth ($P_T$).

9. The pneumatic vehicle tire as claimed in claim 1, wherein the radially outer groove portion that is funnel-shaped in the cross section reaches down to a depth ($t_1$) of from 15% to 30% of the profile depth ($P_T$).

10. The pneumatic vehicle tire as claimed in claim 1, wherein the mutually opposite groove flanks in the radially inner groove portion have wave forms that run in a mutually parallel manner.

11. The pneumatic vehicle tire as claimed in claim 1, wherein the mutually opposite groove flanks in the radially inner groove portion have wave forms that run in a mutually symmetrical manner in relation to a central plane of the circumferential groove that runs in the radial direction.

12. The pneumatic vehicle tire as claimed in claim 1, wherein the circumferential groove is embodied so as to be symmetrical in relation to a central plane thereof that runs in the radial direction.

* * * * *